March 26, 1968  A. P. BROKAW  3,374,851
SIMULTANEOUS DUAL SPACED ACOUSTIC WELL LOGGING SYSTEM
Original Filed June 14, 1960  4 Sheets-Sheet 2

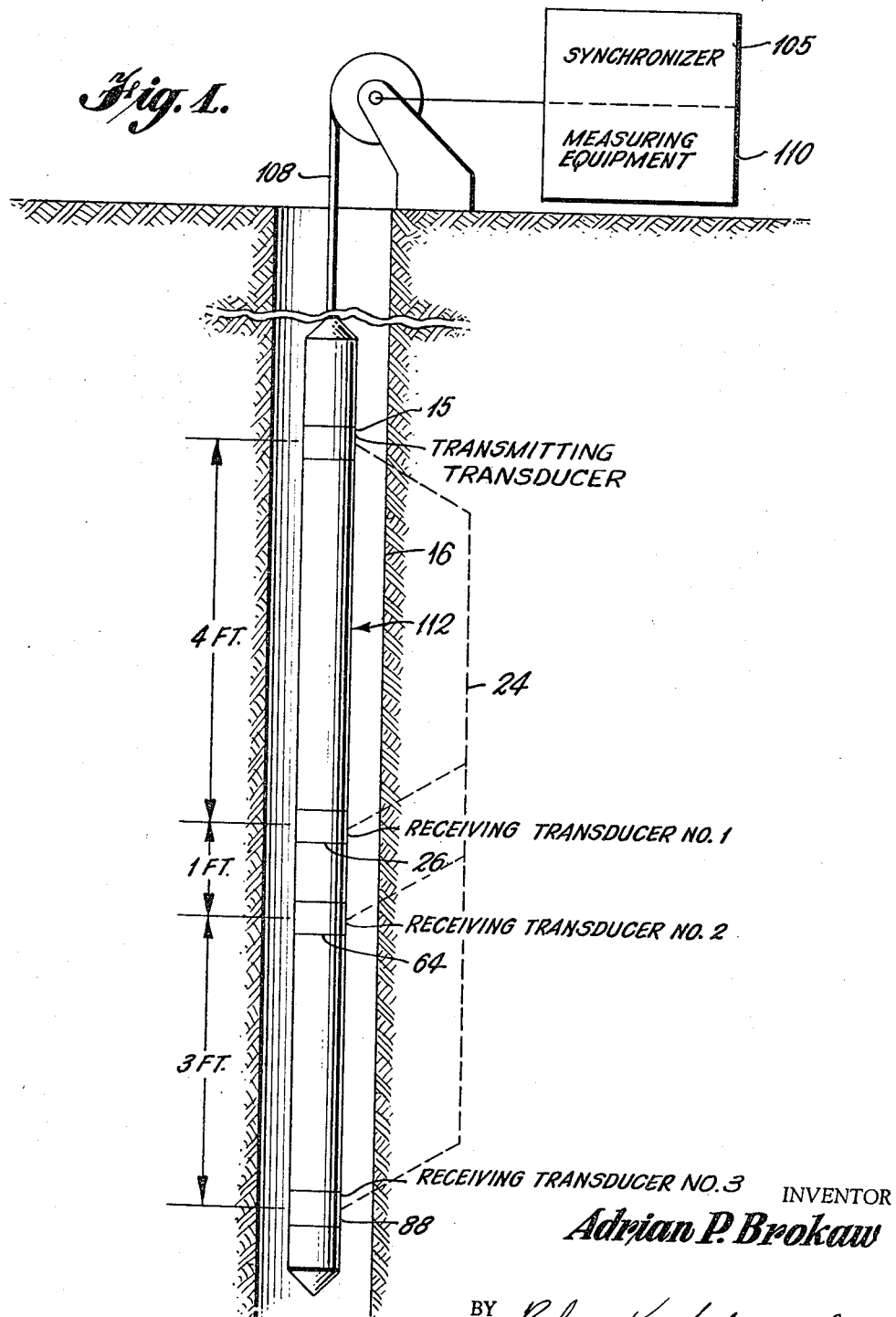

INVENTOR
*Adrian P. Brokaw*
BY *Robert K. Schumacher*
ATTORNEYS

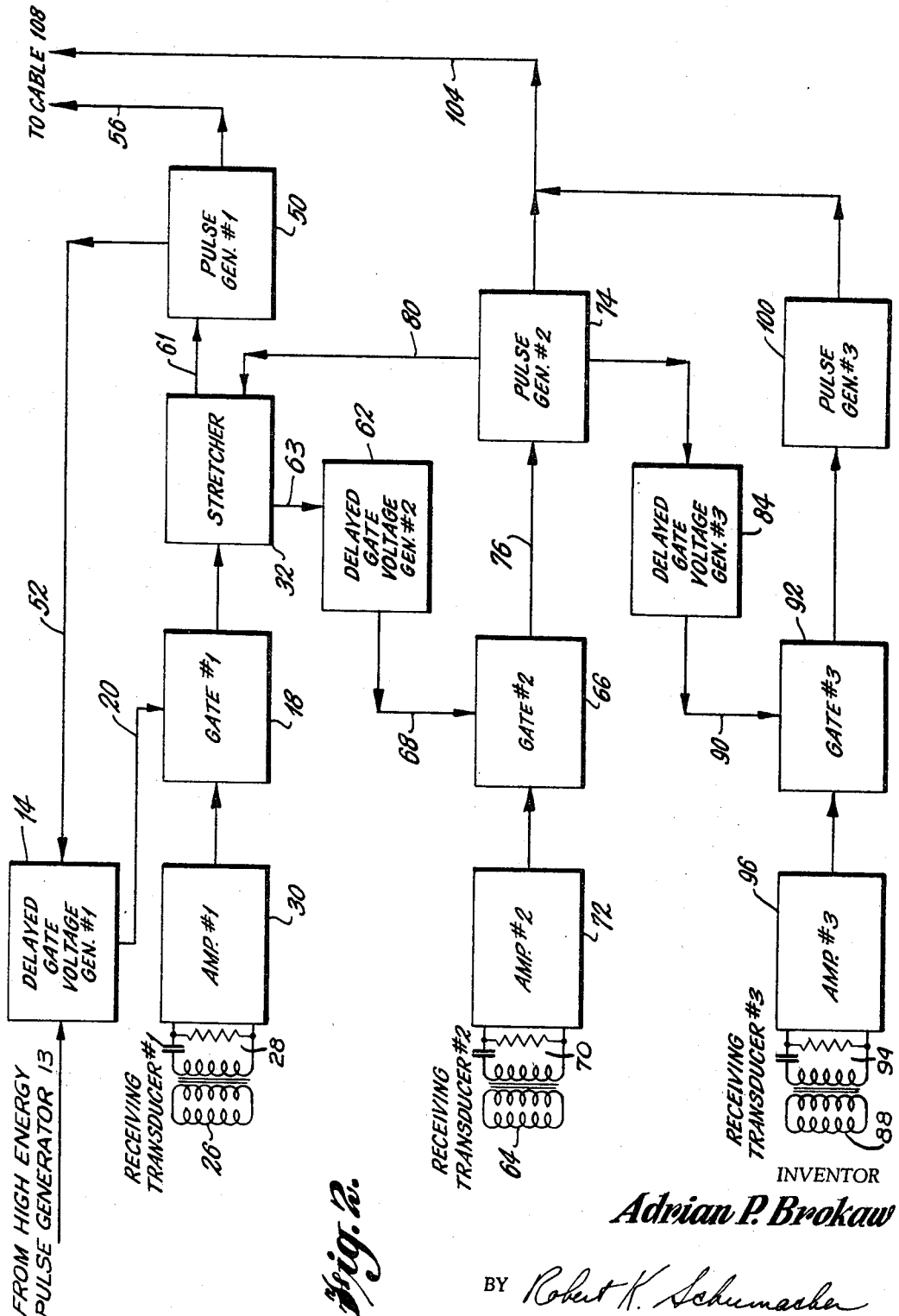

March 26, 1968    A. P. BROKAW    3,374,851
SIMULTANEOUS DUAL SPACED ACOUSTIC WELL LOGGING SYSTEM
Original Filed June 14, 1960    4 Sheets-Sheet 4
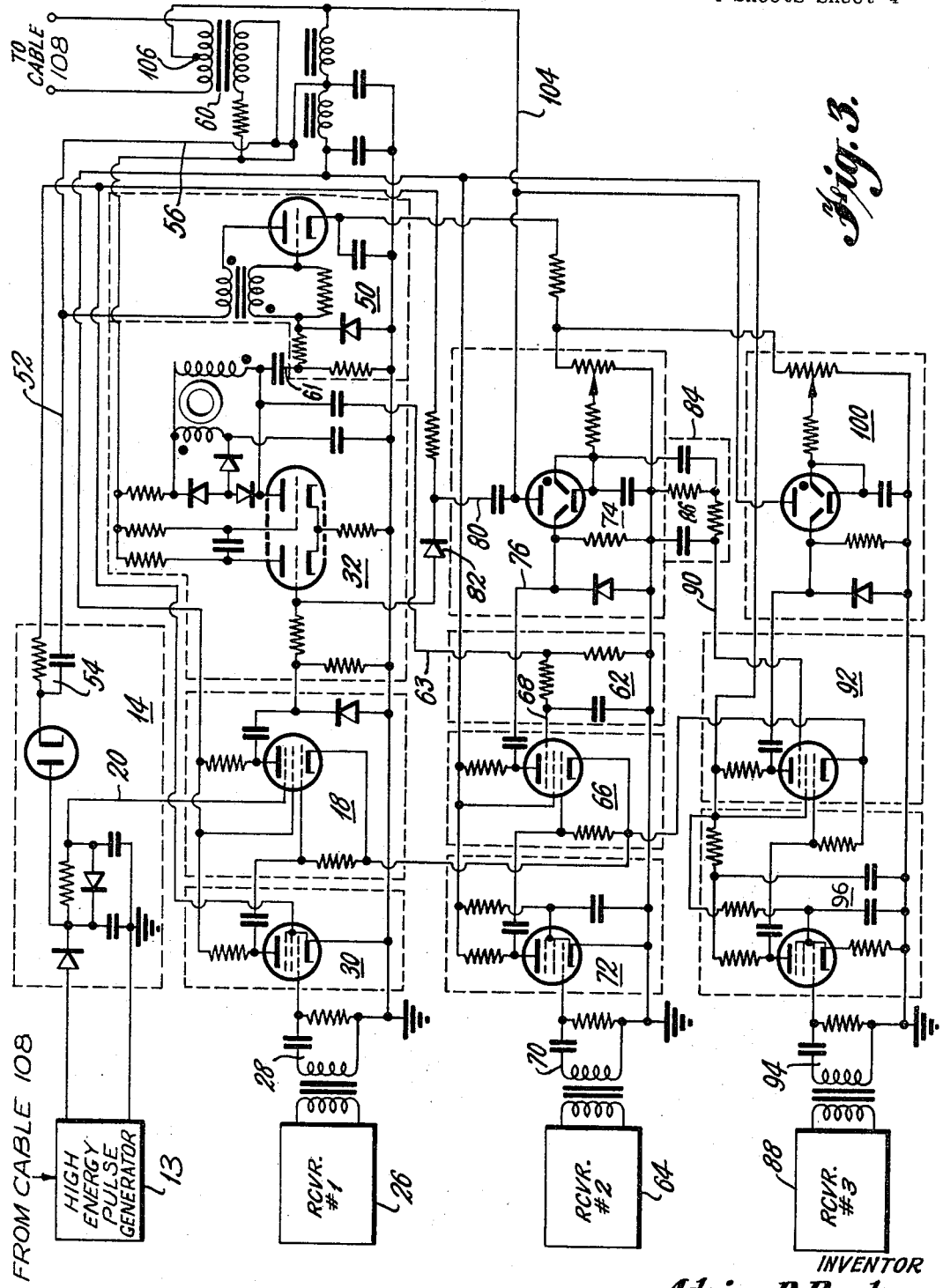
INVENTOR
Adrian P. Brokaw
BY Robert K. Schumacher
ATTORNEY

United States Patent Office 3,374,851
Patented Mar. 26, 1968

1

3,374,851
SIMULTANEOUS DUAL SPACED ACOUSTIC
WELL LOGGING SYSTEM
Adrian P. Brokaw, Stillwater, Okla., assignor, by mesne assignments, to Dresser Industries, Inc., Dallas, Tex., a corporation of Delaware
Continuation of application Ser. No. 35,969, June 14, 1960. This application Aug. 25, 1967, Ser. No. 663,446
4 Claims. (Cl. 181—.5)

ABSTRACT OF THE DISCLOSURE

Three acoustic receivers are trailingly spaced from a single acoustic transmitter. The first receiver circuit is opened after a predetermined delay from the time of the acoustic pulse from the transmitter and closed upon receipt of the pulse. The second receiver circuit, being responsive to the first receiver circuit, is opened after a predetermined delay from the time the acoustic pulse is received in the first receiver circuit and closed upon receipt of the pulse in the second receiver circuit. The third receiver circuit, being responsive to the second receiver circuit, is opened after a predetermined delay from the time the acoustic pulse is received in the second receiver circuit and closed at a predetermined time after opening.

---

This application is a continuation of application Ser. No. 35,969, filed June 14, 1960, now abandoned.

The present invention relates to acoustic well logging systems for producing and measuring transit time intervals for acoustic impulses to pass over different transducer spacings of different lengths along a well bore, and has particular reference to an acoustic well logging system having a tool including electrical components for producing pairs of electrical pulses having the time interval multiplied by a constant value to otherwise provide pulses having intervals that are responsive to the length and the transit time for acoustic energy to pass along different spacings between pairs of receivers in the tool.

Acoustic well logging systems are used to determine primary physical properties of formations or rock extending along and radially away from a bore hole. The acoustic properties of the rock depend on elasticity, state of aggregation, porosity, etc., and are determined by analyzing or computing the time interval for an impulse of acoustic energy to traverse a spacing between acoustic energy receivers.

In acoustic well logging tools where the transducer spacing is comparatively large, the information derived is principally an average of the time for acoustic energy to traverse the spacing; where the transducer spacing is comparatively small, the information indicates thin beds of strata permeate the region around a borehole, as well as indicating substantial continuity of the rock if no changes in time interval are produced and measured.

It is essential to determine the information derived by long and short spacing by a single trip or pass of the logging tool in order to make an adequate comparison of the information developed by long and short spacing. This is not practical by multiple runs of different equipment or tools passing along a borehole, since cable lengths change when subjected to different weights and temperatures, so that it is not otherwise ascertainable that a thin bed or rock is within or adjacent another formation.

It has been found desirable to have two acoustic velocity logs in order to accurately interpret the bore hole formations. This is accomplished by making an acoustic velocity log over a relatively short distance which will yield a measurement and detailed information as to thin formations, bed and interfaces, etc. The other velocity log is measured over a longer spacing to give better "averaging" and higher accuracy. A three foot spacing is useful in giving the long spacing accuracy and yet retain a tolerable signal-to-noise ratio at the more distant receiver. A one foot spacing gives a much more detailed picture of the bore hole conditions, and still retains a high degree of accuracy.

With the present invention there is provided an improved waveform converter for use with an acoustic well logging tool having at least three receiving transducers differentially spaced with respect to each other along the length of the tool and on the same side of a transmitting transducer, and electronic means to convert short time intervals to proportionally longer time intervals where such time intervals relate directly to the acoustic time spacing between the respective receiving transducers.

The present invention provides a waveform converter for stretching intervals between pulses for transmission to measuring equipment at the earth's surface. More particularly, the invention relates to improved and accurate interpretation of bore hole conditions by using an improved electronic apparatus in an acoustic well logging tool.

It is, therefore, the purpose of this invention to provide both a one foot and three foot spacing log simultaneously from one instrument or tool, and with a single "trip" of the tool along the formation, and yet overcome limitations due to cable characteristics, measuring difficulties of the time intervals, and the like.

It is also an object of the present invention to use three receivers and one transmitter to obtain simultaneously, by means of one electronic unit, information in the form of spacing between pulse pairs, which relates to the acoustic properties of a bore hole as measured over a short and long interval, i.e., a one foot and three foot interval.

It is furthermore an object of the present invention to avail of the use of interval multiplication or stretching to obtain the above results, i.e., the stretching of the short time interval to make it comparable with the longer time interval.

It is another object of the invention to use conventional recording equipment at the earth's surface to measure short intervals and long intervals between pulse pairs after interval multiplication or stretching has been performed.

It is another object of the present invention to use various and sundry gating circuit combinations to obtain the result of interval stretching for relatively short spacings of acoustic receiving transducers.

It is, therefore, an object of the present invention to provide an acoustic well logging system for simultaneously analyzing and computing the time interval for an acoustic impulse to traverse different spacings along a bore hole adjacent an acoustic well logging tool.

It is a further object of the invention to provide a tool having acoustic energy receivers defining two distinct spacings.

A further object of the invention is to provide a tool for acoustic well logging with dual spacings between receivers and then produce a pair of pulses for each of the spacings so that the time interval between the pulse pair is proportional to the respective spacings and inversely proportional to the velocity of sound in the formations adjacent the respective spacings.

Another object of the invention is to measure and record simultaneously the time intervals between a plurality of pulse pairs.

The present invention has the advantage of simultaneously determining the characteristics of rock over a long and short spacing along a bore hole adjacent an acoustic well logging tool.

A still further object of the invention is to determine and measure the time interval for acoustic energy to traverse a short and long spacing simultaneously with one instrument and to make each measurement available for recording with only a single "trip" along the formations that are measured.

Yet a further object of the invention is to provide a system that is substantially compatible with other well logging types of tools and systems, so that by use of additional equipment, other related measurements of the formations, such as self-potential, gamma ray, etc., may be made simultaneously by a single tool.

It is yet a further object of the invention to provide a system for acoustic well logging that provides simultaneous measurements of time intervals for acoustic energy to pass through formations adjacent a tool.

The invention will now be described in detail in connection with the accompanying drawings in which:

FIGURE 1 is a graphic illustration of an acoustic well logging tool in a bore hole connected to measuring equipment in accordance with an embodiment of the present invention;

FIGURE 2 is a block diagram of one form of the waveform converter for dual spaced logging tools; and FIGURE 3 is a detailed circuit diagram of a waveform converter in accordance with one particular embodiment of the present invention.

This invention is an improvement of the copending application for patent, in the name of Engle et al., filed Jan. 16, 1959, for "Waveform Converter for Acoustic Logging Tools," having Ser. No. 787,214, now abandoned, this Engle et al. application being the basis for the copending continuation application Ser. No. 663,445, filed Aug. 25, 1967.

Figure 1A:
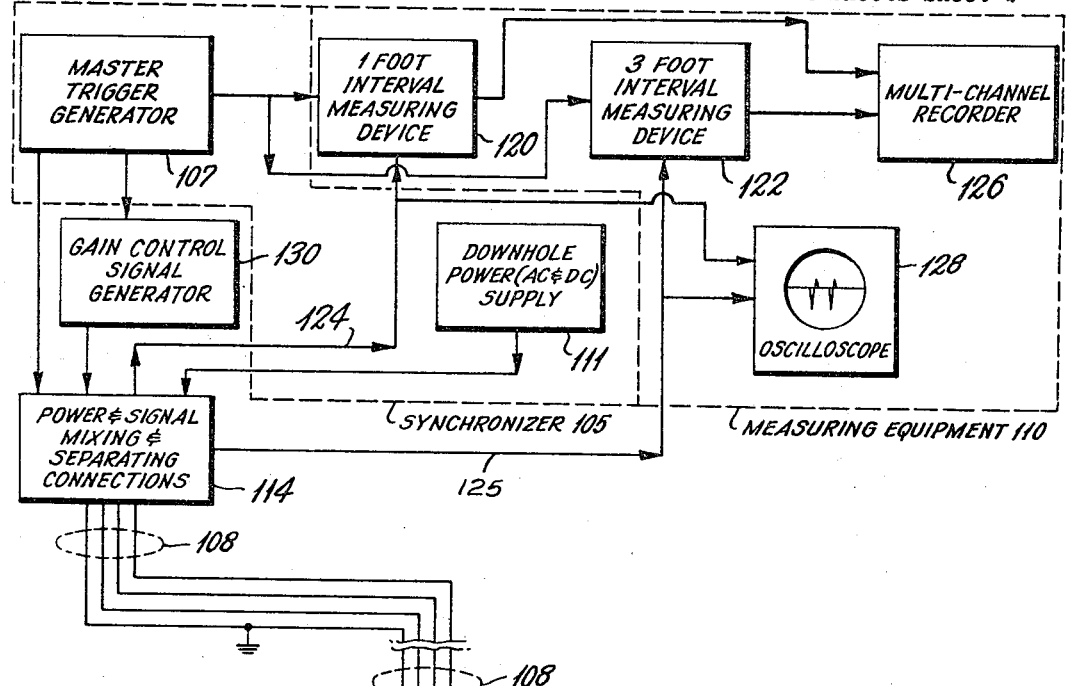
FIGURE 1a is a detailed illustration of an acoustic well logging system of the present invention.
Figure 1A:
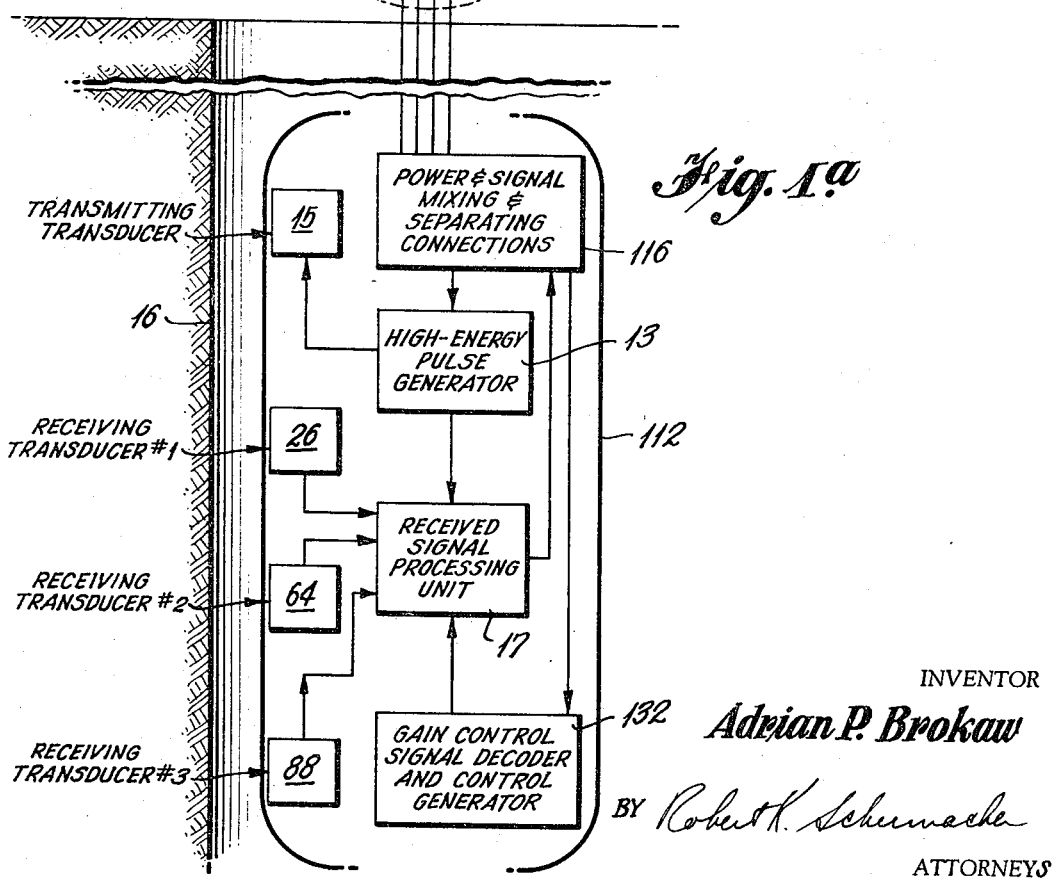

Referring now to the drawings, FIGURES 1 and 1a show generally an acoustic well logging system. A synchronizer 105 having a system or master trigger generator 107 produces an electrical signal that is synchronized with an A.C. power supply 111, and the electrical signal and the A.C. power are sent down a cable 108 to an acoustic well logging tool 112.

Conventional power and signal mixing and separating connections 114 and 116 may be used at each of the cable 108 to conveniently convey the signal and power from the synchronizer to the tool and return signals from the tool to measuring equipment 110. Such mixing and separating connections are shown and described in the copending application of Carl W. Zimmerman and Adrian P. Brokaw Ser. No. 19,233, filed Apr. 1, 1960 entitled "Acoustic Well Logging Transmission System" now Patent No. 3,182,286, and the copending application of Allen W. Engle, John L. Casey and Adrian P. Brokaw, Ser. No. 787,292, filed Jan. 16, 1959, for Acoustic Well Logging System now Patent No. 3,112,466. These conditions provide for minimizing the number of conductors in the cable that are necessary to provide an electrical path, and reduce the cross-talk or cross-feed between signal paths.

The measuring equipment 110 may include a plurality of time interval measuring devices 120, 122 that receive the system or trigger pulse from the master trigger generator 107 as well as information from the tool 112 over conductors 124, 125 from the cable 108. My copending application, Ser. No. 787,213 for "Trigger Generator for Acoustic Well Logging Systems," now Patent No. 3,113,289, describes in further detail a master trigger generator to trigger various units of a logging system in synchronism with an A.C. voltage.

The measuring equipment 110 may further include a multi-channel recorder 126 and an oscilloscope 128.

The two time interval measuring devices are capable of measuring the time lapse between two pulses occurring within a predetermined time interval after the master trigger is received in the tool over cable 108. My copending application, Ser. No. 806,586, filed Apr. 5, 1959, for "Discriminating Interval Time Computer for Acoustic Well Logging Systems," now Patent No. 3,019,413, describes computers of this nature.

A gain control signal generator 130 may be included. This is a device capable of generating gain control signals which will, after passing over the logging cable, affect a gain control signal decoder and control generator 132 in a manner that the gain of various amplifiers are adjusted in accordance with input adjustments of the gain control signal generator. My copending application Ser. No. 15,720, filed Mar. 17, 1960, for "Remote Control System for Acoustics Well Logging Instruments" now Patent No. 3,195,105, shows and describes such an arrangement.

In response to the electrical signal from the synchronizer 105, a high-energy pulse generator 13 in the acoustic well logging tool 112 excites a transmitting transducer 15 to produce acoustic energy that emanates into the well bore 16. From the generator 13 a signal is coupled to a No. 1 delayed gate voltage generator 14 forming part of a received signal processing unit 17, and more particularly shown in FIGURES 2 and 3.

After a suitable delay, which delay is proportional to the time interval for acoustic energy to pass the shortest possible time from the transmitter transducer 15 to a No. 1 receiving transducer 26, an output of the No. 1 gate voltage generator 14 opens the No. 1 gate 18. The delayed gate voltage generator is coupled to the No. 1 gate by conductor 20.

The transmitting transducer produces acoustic energy which travels along a path 24 of the well bore 16 to the first receiving transducer 26. When the first signal arrives at the first receiving transducer, it is converted to an electrical signal and is coupled through a network 28 to a first amplifier 30, and passed through the opened No. 1 gate 18 to a pulse stretcher 32. The pulse stretcher 32 is a device, which, in response to two input pulses, produces an output which may be differentiated by an RC network to product three output pulses. The first of these output pulses is positive and coincident with the first input pulse from the receiving transducer 26. The second output pulse is negative and coincident with the second input pulse which is the first arriving signal at the receiving transducer 64. The third output pulse is positive and occurs at a time after the second input, which time is linearly proportional to the time between the first two inputs. A detailed description of one embodiment of this stretcher and its operation is explained in the copending application of Heinz W. Georgia and Adrian P. Brokaw for "Acoustic Well Logging With Time Interval Multiplication," filed June 14, 1960, having Ser. No. 35,968, now abandoned.

If the third pulse occurs, for example, at a time after the second input which is twice the time between the two inputs, then the output of the stretcher contains two positive output pulses separated in time by an interval three times that of the initial input pulses. These positive pulses are applied to a first pulse generator 50. The first pulse generator produces a high energy pulse for each of the two positive output pulses of the stretcher 32. The first of these high energy pulse outputs serves to provide a control to the delayed gate voltage generator 14 by way of conductor 52 and the RC coupling network 54 contained in delayed gate voltage generator 14 to terminate the pulse in the delayed gate voltage generator so that the first gate 18 is thereby closed. By this circuit arrangement, the first arriving acoustic energy at the first receiving transducer 26 initiates the circuit operation of the pulse stretcher, and any subsequent arrivals of noise, and the like, are prevented from having any operational effect on the circuit arrangement, including the stretcher.

The output of the first pulse generator 50 is also coupled by conductor 56 to a balanced line phantom connected coupling through a transformer 60 for transmission to the surface and measurement in 1 foot interval measuring device 120. This is shown and described in assignee's co-pending application Zimmerman et al., filed Apr. 1, 1960, and having Ser. No. 19,233 under the title of "Acoustic Well Logging Transmission System" now Patent No. 3,182,286. The voltage change produced in the stretcher is utilized in a second delayed gate voltage generator 62 over conductor 63 to produce a gate voltage after a suitable interval. This interval is equal to the shortest possible time for acoustic energy to pass along the formations from adjacent the first receiving transducer 26 to a second receiving transducer 64. A second gate 66 is opened after the suitable interval as determined by the second delayed gate voltage generator 62. This connection is shown as conductor 68.

When the first acoustic energy arrives at the second receiving transducer 64, it is processed similarly by the second receiving transducer 64, a coupling network 70, a second amplifier 72, the second open gate 66, and thence is passed to the second pulse generator 74 over conductor 76. The second pulse generator produces a high energy pulse from the signal received over conductor 76.

The high energy pulse output of the second pulse generator 74 is fed to the pulse stretcher 32 by way of conductor 80 including a diode element 82. This constitutes the second input pulse to the stretcher 32 to effect a change in the stretcher which closes the second gate 66 by way of the second delayed gate voltage generator 62, over conductor 63. Conductor 61 passes a negative output pulse produced by the stretcher at this time, which is ignored by the first pulse generator 50, which is sensitive only to positive pulses.

When the second pulse generator 74 is triggered, it produces an output which is utilized by a third delayed gate voltage generator 84.

The general circuit arrangement of the first receiving transducers 26 and 64, coupling circuits 28 and 70, amplifiers 30 and 72, the gates 18 and 66, the pulse stretcher 32, and the pulse generators 50 and 74, may comprise what is generally known as a first information channel.

The delayed gate voltage generator 84 comprises an integration circuit 86 including a resistance and capacitor, and is used to extend the output of the second pulse generator 74 for a period of time sufficient to encompass the longest interval to be measured by a third receiving transducer 88 after a period of time has expired which is the shortest period of time for acoustic energy to traverse the formations adjacent the second receiving transducer to the third receiving transducer.

After the delayed time effected by delayed voltage generator 84, the gate voltage produced is coupled by a conductor connection 90 to open a third gate 92. With the third gate being open, the first arriving acoustic energy at the third receiving transducer 88 is coupled through coupling network 94 to a third amplifier 96, through the third gate 92 to a third pulse generator 100, which is triggered thereby to produce a high energy pulse output.

The third pulse generator 100 has a recovery time or "dead time" that is sufficiently long so that second arriving acoustic energy and subsequent arrivals thereof at the third receiving transducer do not trigger the third pulse generator again before the third gate closes. This precludes the third pulse generator from producing any additional high energy pulses while the third gate is yet open.

The pulse outputs of the second and third pulse generators 74 and 100 are coupled together to a conductor 104 for passing the high energy pulses therefrom to a center tap 106 of a primary winding of transformer 60. These pulses are coupled to the phantom connection of the balanced line in the cable.

In a preferred embodiment, the two high energy pulses from the first pulse generator 50 define a time interval which is three times the time for acoustic energy to traverse the formations adjacent and between the first receiving transducer 26 and the second receiving transducer 64, and these high energy pulses are sent over a logging cable 108 to the earth's surface and there measured to determine and record the acoustic time. The high energy pulses from the second and third pulse generators define the acoustic time, or the period of time for acoustic energy to traverse the formations adjacent and between the second and third receiving transducer 64, and 88, and are similarly sent to the surface over the logging cable 108 for measurement in 3 foot interval measuring device 122.

It is to be noted that the pulse stretcher 32 serves a dual purpose in this waveform converter. The character of the logging cables now commonly in use is such that the time interval between two high energy pulses which are less than approximately 100 microseconds apart, is difficult to measure with any great degree of accuracy. With a short physical spacing between the first receiving transducer 26 and the second receiving transducer 64, e.g., one foot, an interval as short as 40 microseconds may be expected, which must be accurately measured at the earth's surface. Due to the poor pulse transmission characteristic of the cables, this becomes difficult for pulses so close together in time, and the pulse stretcher serves to enhance more accurate measurment by multiplying the pulse interval by a factor of, for example, three.

Further, by selecting the proper ratio of input time to output time, the range of intervals out of the pulse stretcher 32 may be made relatively equal to the range of intervals of the longer spacing between the second receiving transducer and the third receiving transducer. If these two ranges are equal, then similar measuring equipment 110 may be used at the surface for measuring and recording both signals, or their intervals. The one foot and three foot information may be combined and sent up one signal path, or they may be sent up two different paths to facilitate ease of handling at the earth's surface.

The second and third receiving transducers, 64 and 88, the coupling networks 70 and 94, the second and third amplifiers 72 and 96, the second and third gates 66 and 92, the second and third pulse generators 74 and 100, the third delayed gate voltage generator 84, altogether may constitute a second information channel having the output signals thereof coupled over conductor 104 to the cable. It is within the scope of the present invention to provide a single pulse generator for each information channel, e.g., the first and second information channels. The second information channel may have a storage and pulse stretcher circuit with the stretching or multiplying characteristic in the ratio of one to one, and thereby eliminate a plurality of pulse generators and other circuits in the second information channel.

Further, the invention in the waveform converter may be furnished with a system of gain controls, circuit connections for providing formation signatures and transmission thereof over the cable, and similar signal transmission arrangements described in the single spacing receiving transducers as disclosed in the aforementioned co-pending applications.

It should be understood, however, that the specific apparatus herein illustrated and described is intended to be representative only, as many changes may be made therein without departing from the clear teachings of the in-

I claim:
1. An acoustic well logging system comprising
   an acoustic energy transmitting circuit including a transmitting transducer,
   first, second, and third normally-closed acoustic energy receiving circuits including first, second, and third receiving transducers trailingly spaced from said transmitting transducer in an unequally spaced-apart relationship one to another,
   first, second and third pulse generators interconnected respectively with said first, second, and third receiver circuits,
   first gating means actuated by the production of acoustic energy by said transmitting circuit to open said first receiver circuit after a first predetermined delay interval functionally related to the spacing between said transmitting transducer and said first receiving transducer,
   second gating means actuable by said receiver circuit to open said second receiver circuit after a second predetermined delay interval functionally related to the spacing between said first and second receiving transducers,
   third gating means actuable by said second pulse generator to open said third receiver circuits after a third predetermined delay interval functionally related to the spacing between said second and third receiving transducers and adapted to close after a fourth predetermined time interval, and
   stretcher means adapted to actuate said first pulse generator and said second gating means in coincidence with the first portion of any acoustic energy detected and accepted by said first receiver circuit and upon the actuation of said second pulse generator to further actuate said first pulse generator after a fifth time interval which is a preselected multiple of the time interval between the actuation of said first and second pulse generators.

2. The system described in claim 1, including transmission and utilization circuitry having a first information channel connected to said first pulse generator and a second information channel connected to said second and third pulse generators.

3. An acoutic well logging system comprising
   an acoustic energy transmitter,
   a first acoustic energy receiver arranged at a first distance from said transmitter,
   a second acoustic energy receiver arranged from said first receiver and said transmitter at a second distance from said first receiver,
   a third acoustic energy receiver arranged from said first and second receivers and said transmitter at a third distance from said second receiver which is different from said second distance,
   a first gate connected to said first receiver and when open passing any signals therefrom,
   a first gate actuating means responsive to said transmitter to open said first gate after a first predetermined time interval corresponding to the shortest time necessary for an acoustic pulse to travel from said transmitter to said first receiver through media adjacent thereto,
   a second gate connected to said second receiver and when open passing any signals therefrom,
   a second gate actuating means for opening said second gate after a second predetermined time interval corresponding to the shortest time necessary for said acoustic pulse to travel from said first receiver to said second receiver through media adjacent thereto,
   a third gate connected to said third receiver and when open passing any signals therefrom,
   third gate actuating means for opening said third gate after a third predetermined time interval corresponding to the shortest time necessary for said acoustic pulse to travel from said second receiver to said third receiver through media adjacent thereto,
   a first pulse generator responsive to input pulses of a first polarity to produce functionally related output pulses, said first pulse generator being interconnected with said first gate actuating means so that said output pulses from said first pulse generator deactivate said first gate actuating means to close said first gate,
   a second pulse generator responsive to signals from said second gate to provide functional related output pulses to actuate said third gate actuating means,
   a third pulse generator responsive to signals from said third gate to provide functionally related output pulses, said third pulse generator being further adapted to deactivate after a predetermined fourth time interval,
   stretcher means for producing a first pulse of a first polarity in response to the initial input pulse of a signal passed by said first gate and for applying said first pulse of said first polarity to said first pulse generator and said second gate actuating means, said stretcher means also providing a second pulse of a second polarity in response to each of said output pulses produced by said second pulse generator and applying said second pulse of said second polarity to said second gate actuating means to close said second gate, said stretcher means also providing a third pulse of said first polarity after a fifth time interval following said second pulse of said second polarity which is a preselected multiple of the interval between said pulse of said second polarity and said first pulse of said first polarity, and
   transmitting and recording means having a first information channel connected to receive said output pulses produced by said first pulse generator and a second information channel connected to receive said output pulses produced by said second and third pulse generators.

4. An acoustic well logging system comprising:
   an acoustic energy transmitting circuit having a transmitting transducer for generating acoustic energy in a medium when actuated,
   means coupled to said transmitting transducer for actuating said transducer,
   first, second and third normally-closed acoustic energy receiving circuits including first, second and third receiving transducers, respectively, trailingly spaced from said transmitting transducer,
   a first gate in said first receiving circuit and when open passing any signals therethrough,
   a first gate actuating means responsive to said transmitting circuit to open said first gate after a first predetermined time interval corresponding to the shortest time necessary for an acoustic pulse to travel from said transmitting transducer to said first receiving transducer through the medium adjacent thereto and responsive to said first receiving circuit to close said first gate upon the receipt of a signal by said first receiving circuit,
   a second gate in said second receiving circuit and when open passing any signals therethrough,
   a second gate actuating means responsive to said first receiving circuit for opening said second gate after a second predetermined time interval corresponding to the shortest time necessary for said acoustic pulse to travel from said first receiver to said second receiver through the medium adjacent thereto and responsive to said second receiving circuit to close said second gate upon the receipt of a signal by said second receiving circuit,
   a third gate in said third receiving circuit and when open passing any signals therethrough, a third gate actuating means responsive to said second receiving circuit for opening said third gate after a third predetermined time interval corresponding to the shortest time necessary for said acoustic pulse to travel from said second receiver to said third receiver through the medium adjacent thereto, said third gate being adapted to be closed after a fourth predetermined time interval corresponding to the longest time necessary for said acoustic pulse to travel from said second receiver to said third receiver.

References Cited

UNITED STATES PATENTS

| 2,704,364 | 3/1955 | Summers | 181—.5 |
| 2,938,592 | 5/1960 | Charske et al. | 181—.5 |
| 3,050,150 | 8/1962 | Tixier | 181—.5 |

BENJAMIN A. BORCHELT, *Primary Examiner.*

R. M. SKOLNIK, W. KUJAWA, *Assistant Examiners.*

UNITED STATES PATENT OFFICE
CERTIFICATE OF CORRECTION

Patent No. 3,374,851                          March 26, 1968

Adrian P. Brokaw

It is certified that error appears in the above identified patent and that said Letters Patent are hereby corrected as shown below:

Column 3, line 59, "each of" should read -- each end of --; line 69, "conditions" should read -- connections --. Column 4, line 15, "April 5, 1959" should read -- April 15, 1959 --; line 30, "synchonizer" should read -- synchronizer --; line 54, "product" should read -- produce --. Column 5, line 56, "cricuit" should read -- circuit --.

Signed and sealed this 13th day of January 1970.

(SEAL)
Attest:

Edward M. Fletcher, Jr.                     WILLIAM E. SCHUYLER, JR.
Attesting Officer                             Commissioner of Patents